United States Patent [19]
Lin et al.

[11] Patent Number: 5,831,976
[45] Date of Patent: Nov. 3, 1998

[54] METHOD AND APPARATUS FOR TIME SHARING A RADIO COMMUNICATION CHANNEL

[75] Inventors: Jyh-Han Lin, Fort Worth; Pavan Jyotsna Achyutuni, N. Richland Hills; Sachin Waman Danait, Irving; Samir Sawaya, Grapevine, all of Tex.

[73] Assignee: Motorola, Inc., Schaumburg, Ill.

[21] Appl. No.: 642,360

[22] Filed: May 3, 1996

[51] Int. Cl.⁶ .................................................. H04Q 7/00
[52] U.S. Cl. ......................... 370/329; 370/468; 455/452; 455/453
[58] Field of Search ................................. 455/443, 447, 455/450, 452, 453, 454; 370/229, 232, 234, 260, 336, 337, 347, 348, 441, 442, 465, 468, 329, 431

[56] References Cited

U.S. PATENT DOCUMENTS

| | | |
|---|---|---|
| 4,875,038 | 10/1989 | Siwiak et al. ..................... 340/825.44 |
| 4,899,337 | 2/1990 | Hirai ......................................... 370/80 |
| 5,440,564 | 8/1995 | Ovada et al. ............................ 370/112 |
| 5,535,207 | 7/1996 | Dupont ................................... 455/452 |
| 5,613,198 | 3/1997 | Ahmadi et al. ........................ 455/452 |
| 5,648,958 | 7/1997 | Counterman ........................... 370/462 |
| 5,666,653 | 9/1997 | Ahl ......................................... 455/443 |

*Primary Examiner*—Ajit Patel
*Attorney, Agent, or Firm*—R. Louis Breeden

[57] ABSTRACT

Time sharing of a radio communication channel among a plurality of interfering cells (302) is provided. The radio communication channel transmits information in a plurality of time slots (502). The radio communication channel is partitioned (704) into a plurality of virtual channels (V1, V2). A virtual channel is used for communicating simultaneously with corresponding ones of the plurality of interfering cells which are assigned to the virtual channel. No more than one of the plurality of virtual channels operates during any one of the plurality of time slots, and the time sharing of the radio communication channel is optimized (708, 710) by activating selected ones of the plurality of virtual channels, based upon a traffic load applicable to the corresponding ones of the plurality of interfering cells.

20 Claims, 4 Drawing Sheets

300

400

5,831,976

METHOD AND APPARATUS FOR TIME SHARING A RADIO COMMUNICATION CHANNEL

FIELD OF THE INVENTION

This invention relates in general to radio communication systems, and more specifically to a method and apparatus for time sharing a radio communication channel.

BACKGROUND OF THE INVENTION

Modern two-way messaging systems have employed transmitter time sharing techniques to reduce interference between cells and to maximize system capacity. One such technique is a fully dynamic time sharing technique in which virtually any transmitter is allowed to operate on a channel simultaneously with any other transmitter on the same channel, provided that the resultant co-channel interference does not exceed a predetermined amount. This technique relies upon a transmitter exclusion table which has to be derived from simulations, and it requires complex real-time calculations, which can usurp a substantial amount of computing power.

An alternative technique is a static time sharing technique based upon an assumed traffic distribution and radio propagation model. The static technique assigns interfering cells to "virtual" channels based on a predetermined radio propagation model, and then time shares the virtual channels on a single radio communication channel in a fixed arrangement of time intervals based on the assumed traffic distribution. This approach has the advantage of low complexity and low computing power requirements, but suffers from its inability to adapt to changes in traffic load distribution over time. The latter disadvantage can cause a virtual channel to be activated, for example, when there is little or no traffic for that virtual channel, thereby wasting valuable air time, while another virtual channel temporarily may have more traffic than it can handle during its allotted air time.

Thus, what is needed is a time sharing technique that is less complex than the fully dynamic time sharing technique, but that can provide automatic adaptation to changes in traffic load distribution over time.

SUMMARY OF THE INVENTION

An aspect of the present invention is a method in a radio communication system for providing time sharing of a radio communication channel among a plurality of interfering cells. The radio communication channel is utilized by the radio communication system for transmitting information in a plurality of time slots. The method comprises the step of partitioning the radio communication channel into a plurality of virtual channels, a virtual channel able to be activated for the duration of one or more of the plurality of time slots, and utilized by a fixed portion of the radio communication system for communicating simultaneously with portable subscriber units in corresponding ones of the plurality of interfering cells which are assigned to the virtual channel. The method further comprises the steps of operating no more than one of the plurality of virtual channels during any one of the plurality of time slots, and optimizing the time sharing of the radio communication channel by activating selected ones of the plurality of virtual channels during the one or more of the plurality of time slots, based upon a traffic load defined for each virtual channel to be equal to the traffic load handled by a busiest one of the plurality of interfering cells assigned to the virtual channel.

Another aspect of the present invention is a communication system controller in a radio communication system for providing time sharing of a radio communication channel among a plurality of interfering cells. The radio communication channel is utilized by the radio communication system for transmitting information in a plurality of time slots. The communication system controller comprises a network interface for accepting messages to be transmitted on the radio communication channel, and a transmitter interface coupled to the network interface for transmitting the messages. The communication system controller further comprises a processing system coupled to the network interface and to the transmitter interface for directing operations of the communication system controller. The communication system controller also includes a partitioner coupled to the processing system for partitioning the radio communication channel into a plurality of virtual channels, a virtual channel able to be activated for the duration of one or more of the plurality of time slots, and utilized by a fixed portion of the radio communication system for communicating simultaneously with portable subscriber units in corresponding ones of the plurality of interfering cells which are assigned to the virtual channel. In addition, the communication system controller comprises a multiplexer coupled to the processing system for operating no more than one of the plurality of virtual channels during any one of the plurality of time slots. The processing system is programmed to optimize the time sharing of the radio communication channel by activating selected ones of the plurality of virtual channels during the one or more of the plurality of time slots, based upon a traffic load defined for each virtual channel to be equal to the traffic load handled by a busiest one of the plurality of interfering cells assigned to the virtual channel.

Another aspect of the present invention is a method in a radio communication system for providing time sharing of a radio communication channel among a plurality of interfering cells. The radio communication channel is utilized by the radio communication system for transmitting information in a plurality of time slots. The method comprises the step of partitioning the radio communication channel into a plurality of virtual channels, a virtual channel able to be activated for the duration of one or more of the plurality of time slots, and utilized by a fixed portion of the radio communication system for communicating simultaneously with portable subscriber units in corresponding ones of the plurality of interfering cells which are assigned to the virtual channel. The method further comprises the steps of operating no more than one of the plurality of virtual channels during any one of the plurality of time slots, and optimizing the time sharing of the radio communication channel by activating selected ones of the plurality of virtual channels during the one or more of the plurality of time slots, based upon a traffic load defined for each virtual channel to be equal to an average traffic load handled by the plurality of interfering cells which are assigned to the virtual channel.

Another aspect of the present invention is a communication system controller in a radio communication system for providing time sharing of a radio communication channel among a plurality of interfering cells. The radio communication channel is utilized by the radio communication system for transmitting information in a plurality of time slots. The communication system controller comprises a network interface for accepting messages to be transmitted on the radio communication channel, and a transmitter interface coupled to the network interface for transmitting the messages. The communication system controller further comprises a processing system coupled to the network interface and to the transmitter interface for directing operations of the communication system controller. The communication system controller also includes a partitioner coupled to the processing system for partitioning the radio communication channel into a plurality of virtual channels, a virtual channel able to be activated for the duration of one or more of the plurality of time slots, and utilized by a fixed portion of the radio communication system for communicating simultaneously with portable subscriber units in corresponding ones of the plurality of interfering cells which are assigned to the virtual channel. In addition, the communication system controller comprises a multiplexer coupled to the processing system for operating no more than one of the plurality of virtual channels during any one of the plurality of time slots. The processing system is programmed to optimize the time sharing of the radio communication channel by activating selected ones of the plurality of virtual channels during the one or more of the plurality of time slots, based upon a traffic load defined for each virtual channel to be equal to an average traffic load handled by the plurality of interfering cells which are assigned to the virtual channel.

DESCRIPTION OF THE PREFERRED EMBODIMENT

Figure 1:
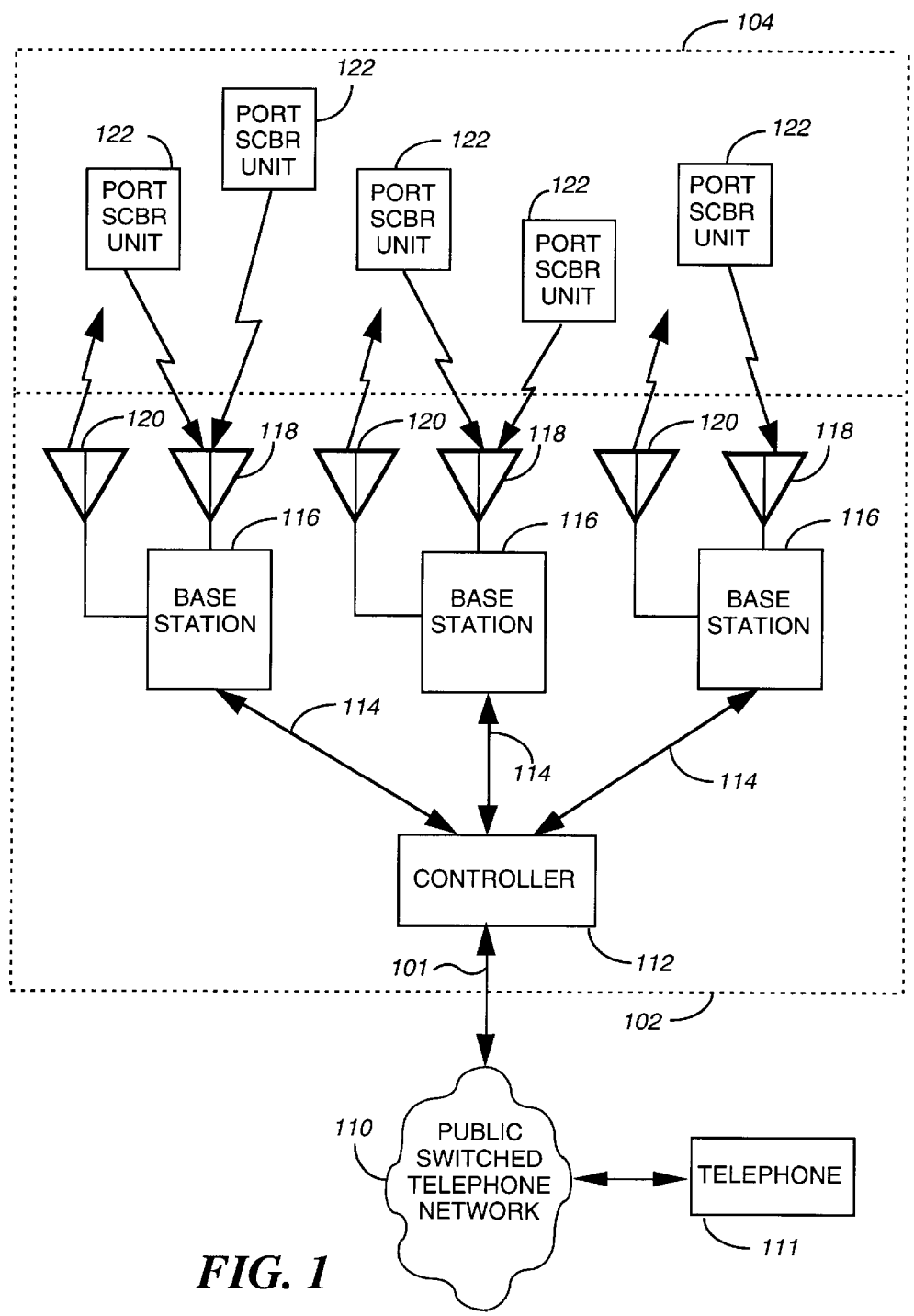
FIG. 1 is an electrical block diagram of a radio communication system in accordance with the preferred embodiment of the present invention.

Referring to FIG. 1, an electrical block diagram of a radio communication system in accordance with the present invention comprises a fixed portion 102 and a portable portion 104. The fixed portion 102 comprises a plurality of conventional base stations 116 including base transceivers which are coupled by communication links 114 to a communication system controller 112 for controlling the base stations 116. The hardware of the controller 112 is preferably a combination of the Wireless Messaging Gateway (WMG™) Administrator! paging terminal and the RF-Conductor!™ message distributor manufactured by Motorola, Inc. of Schaumburg, Ill. The hardware of the base stations 116 is preferably similar to the Nucleus™ Orchestra! base station manufactured by Motorola, Inc. of Schaumburg, Ill. Other similar hardware can be utilized as well for the controller 112 and base stations 116. The controller 112 comprises a plurality of firmware elements in accordance with the present invention, as will be described further below.

Each of the base stations 116 transmits radio signals to the portable portion 104 comprising a plurality of portable subscriber units 122 via a transmitting antenna 120. The base stations 116 each receive radio signals from the plurality of portable subscriber units 122 via a receiving antenna 118. The radio signals comprise selective call addresses and messages transmitted to the portable subscriber units 122 and acknowledgments received from the portable subscriber units 122. It will be appreciated that the portable subscriber units 122 can also originate messages other than acknowledgments. The controller 112 preferably is coupled to a conventional telephone 111 via telephone links 101 and a public switched telephone network (PSTN) 110 for receiving selective call originations therefrom. Selective call originations comprising voice and data messages from the PSTN 110 can be generated, for example, from the conventional telephone 111 coupled to the PSTN 110 in a manner that is well known in the art. It will be appreciated that, alternatively, the controller 112 can be coupled to other types of communication networks, e.g., local area networks, cable networks, etc., for receiving selective call originations.

Data and control transmissions between the base stations 116 and the portable subscriber units 122 preferably utilize a well-known digital selective call signaling protocol, such as a protocol from the Motorola FLEX™ family of protocols. These protocols utilize well-known error detection and error correction techniques and are therefore tolerant to bit errors occurring during transmission, provided that the bit errors are not too numerous in any one code word. In addition, these protocols transmit data in a sequence of predetermined time slots, or frames. It will be appreciated that other similar protocols can be utilized as well in accordance with the present invention.

Outbound channel transmissions comprising data and control signals from the base stations 116 preferably utilize two- and four-level frequency shift keyed (FSK) modulation, operating at sixteen-hundred or thirty-two-hundred symbols-per-second (sps), depending on traffic requirements and system transmission gain. Inbound channel transmissions from the portable subscriber units 122 to the base stations 116 preferably utilize four-level FSK modulation at a rate of ninety-six-hundred bits per second (bps). Inbound channel transmissions preferably occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on a single carrier frequency utilizing well-known time division duplex (TDD) techniques for sharing the frequency. It will be appreciated that, alternatively, frequency division duplex (FDD) can be utilized as well for the outbound and inbound channels. Also, while the preferred embodiment of the present invention calls for an acknowledge-back selective call communication system as depicted in FIG. 1, one of ordinary skill in the art will recognize that, alternatively, the claimed invention can operate as well in a one-way communication system.

U.S. Pat. No. 4,875,038 to Siwiak et al., which describes a prior art acknowledge-back selective call communication system, is hereby incorporated herein by reference. For further information on the operation and structure of an acknowledge-back selective call communication system, please refer to the Siwiak et al. patent.

Figure 2:
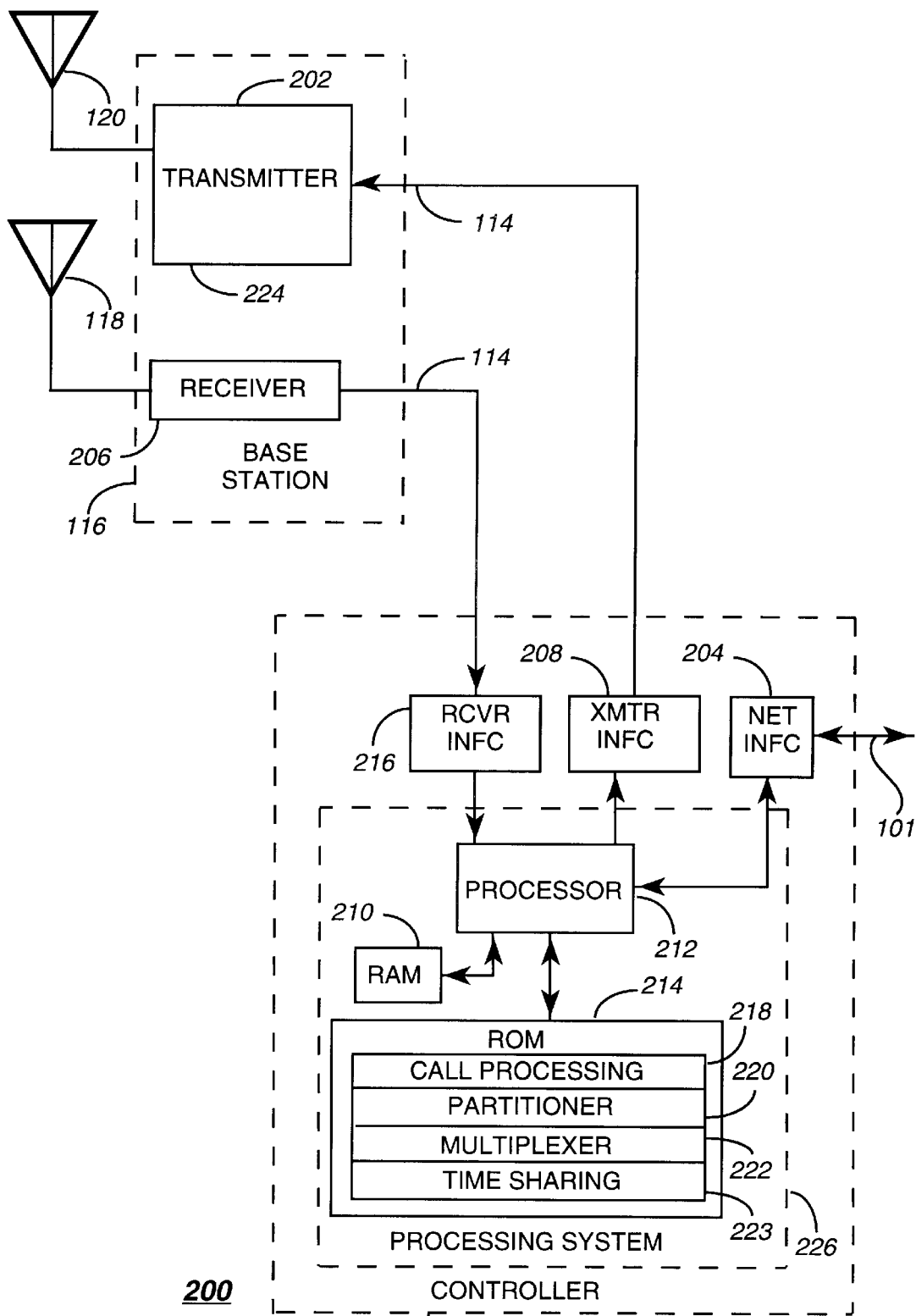
FIG. 2 is an electrical block diagram of portions of a communication system controller and base station in accordance with the preferred embodiment of the present invention.

Referring to FIG. 2, an electrical block diagram 200 of portions of the controller 112 and base station 116 in accordance with the preferred embodiment of the present invention shows that the controller 112 comprises a processing system 226 for directing operation of the controller 112. The processing system 226 includes a processor 212 that is preferably coupled through a transmitter interface 208 to a transmitter 202, both utilizing conventional techniques well known in the art. The transmitter 202 preferably transmits two- and four-level FSK data messages to the portable subscriber units 122.

The processor 212 is also coupled through a conventional receiver interface 216 to at least one acknowledgment receiver 206 using conventional binary FSK demodulation. The acknowledgment receiver 206 can be collocated with the base stations 116, as implied in FIG. 2, but preferably is positioned remote from the base stations 116 to avoid interference from the transmitter 202. The acknowledgment receiver 206 is for receiving one or more acknowledgments from the plurality of portable subscriber units 122. In addition, the processor 212 is coupled through a network interface 204 to the telephone links 101 and thence to the PSTN 110 for receiving message originations therefrom.

The processor 212 is coupled to a random access memory (RAM) 210 for storing messages to be transmitted to the portable subscriber units 122, and for storing messages received from the portable subscriber units 122. The RAM 210 is also utilized for storing a recent history of traffic loads presented to the system, as will be described further below. The processor 212 also is coupled to a read-only memory (ROM) 214 comprising firmware elements for use by the processor 212. It will be appreciated that other types of memory, e.g., electrically erasable programmable ROM (EEPROM) or magnetic disk memory, can be utilized as well for the ROM 214 or RAM 210. It will be further appreciated that the RAM 210 and the ROM 214, singly or in combination, can be integrated as a contiguous portion of the processor 212. Preferably, the processing system 226 is a conventional, commercially available computer system such as a VME Sparc processor system manufactured by Sun Microsystems, Inc. It will be appreciated that other similar processors can be utilized as well for the processing system 226, and that additional processing systems of the same or alternative type can be added as required to handle the processing requirements of the controller 112.

The firmware elements of the controller 112 comprise a call processing element 218 for processing calls in a manner well known in the art. The firmware elements further comprise a partitioner 220 and a multiplexer 222. The firmware elements also include a time sharing element 223. The partitioner 220, the multiplexer 222, and the time sharing element 223 cooperate to provide time sharing of the radio communication channels of the radio communication system in accordance with the present invention, as will be described below.

Figure 3:
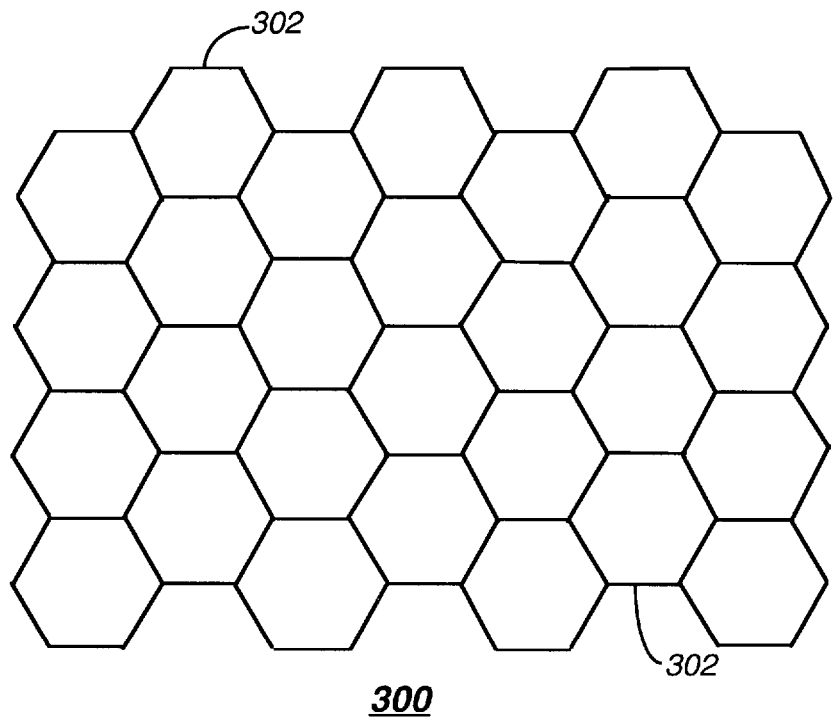
FIG. 3 is a coverage diagram for the radio communication system in accordance with the preferred embodiment of the present invention.

FIG. 3 is a coverage diagram 300 for the radio communication system in accordance with the preferred embodiment of the present invention. Preferably, coverage is provided in a plurality of contiguous cells 302, a cell comprising at least one of the base stations 116. As transmissions occurring within a cell 302 can interfere with transmissions of nearby cells 302, the system uses frequency division multiplexing among the cells to help control the interference. In addition, because the number of frequencies (i.e., radio channels) is limited, time sharing of the radio channels by groups of the cells 302 is required to further control the interference.

In accordance with the present invention, the time sharing is accomplished by partitioning each radio channel into a plurality of "virtual" channels, each virtual channel having assigned thereto a plurality of the cells 302 selected such that the cells 302 can carry simultaneous transmissions on a single radio channel without causing excessive interference with one another. Preferably, a virtual channel is activated for the duration of one or more of the time slots, or frames, of the transmission protocol used in the communication system, and only one virtual channel is allowed to be active during any given time slot on any given radio channel.

Figure 4:
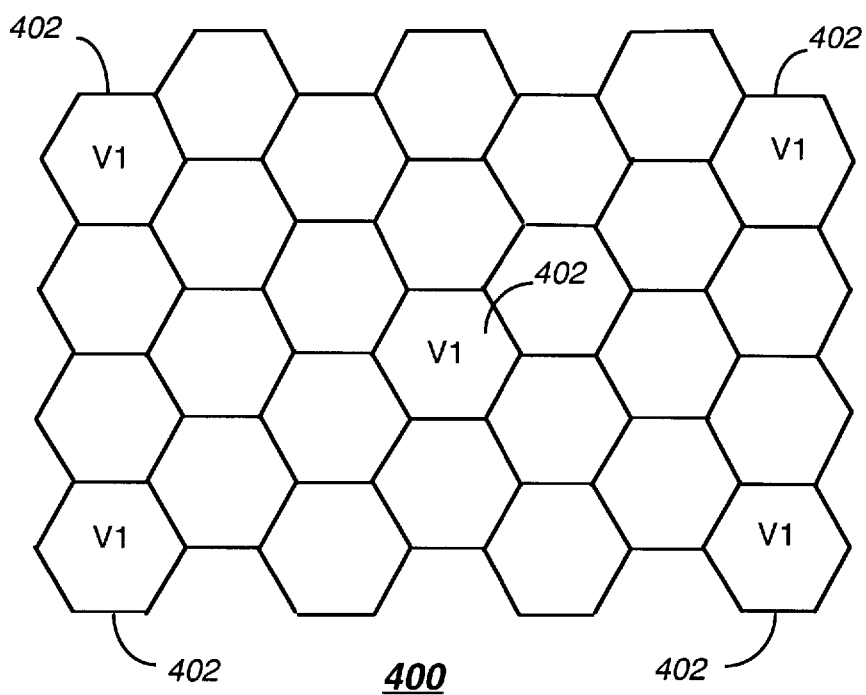
FIG. 4 is the coverage diagram depicting cells activated by a virtual channel in accordance with the preferred embodiment of the present invention.

FIG. 4 is a coverage diagram 400 depicting cells 402 activated by a virtual channel (V1) in accordance with the preferred embodiment of the present invention. Note that the cells 402 are separated geographically to reduce interference among the transmissions taking place on the same radio channel. If additional radio channels are available, other cells of the coverage diagram can also be activated at the same time as the cells 402, provided that the other cells operate on a radio channel different from that used by the cells 402.

Figure 5:
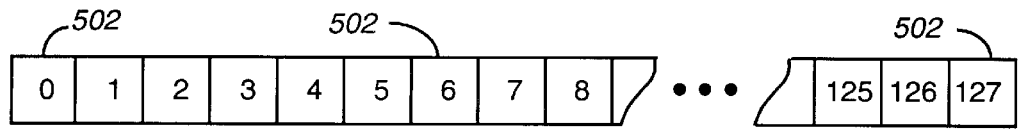
FIG. 5 is a simplified timing diagram of a frame cycle of a transmission protocol used in the radio communication system in accordance with the preferred embodiment of the present invention.

FIG. 5 is a simplified timing diagram of a frame cycle 500 of the transmission protocol used in the radio communication system in accordance with the preferred embodiment of the present invention. The diagram depicts the time slots, or frames, 502 utilized for transmitting information in the communication system. Preferably, the frame cycle contains 128 of the time slots 502 transmitted during a four-minute period and is repeated as long as the system operates. It will be appreciated that, alternatively, a different frame cycle comprising a different number of time slots and lasting for a different time period can be utilized as well for the frame cycle 500.

Figure 6:
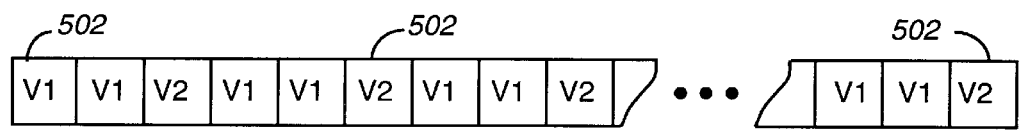
FIG. 6 is a timing diagram depicting virtual channel multiplexing during the frame cycle in accordance with the preferred embodiment of the present invention.

FIG. 6 is a timing diagram 600 depicting virtual channel multiplexing in accordance with the preferred embodiment of the present invention. The diagram 600 depicts an example of two virtual channels (V1 and V2) time sharing the frame cycle 500. Note that no more than one virtual channel operates during any given time slot 502. Note also that the virtual channel V1 is activated with a greater frequency of activation (i.e., more times per frame cycle) than that of the virtual channel V2. The greater frequency of activation of V1 will occur, for example, in accordance with the present invention, in response to the estimated traffic load of the transmitters assigned to V1 being larger than the estimated traffic load of the transmitters assigned to V2, as explained further below.

Figure 7:
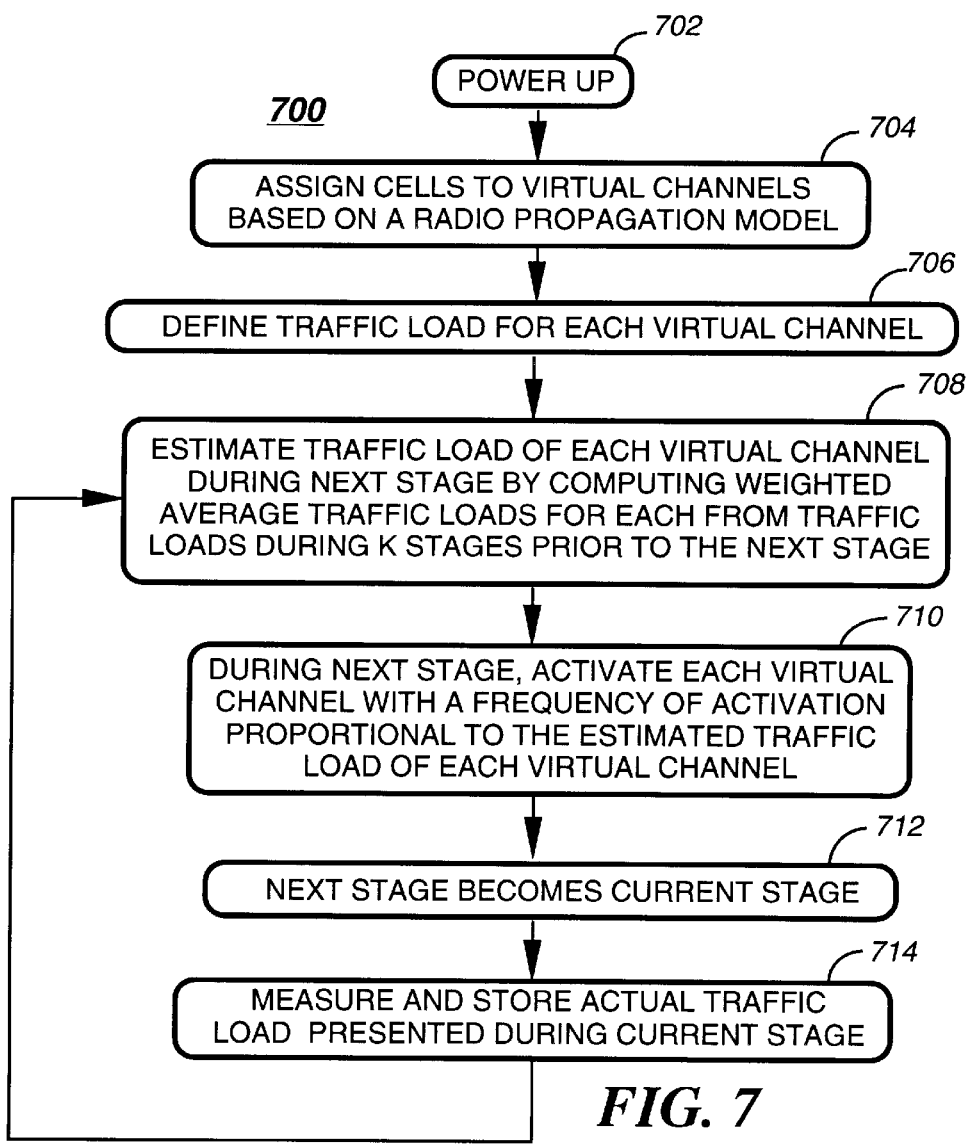
FIG. 7 is a flow chart depicting operation of the radio communication system in accordance with the preferred embodiment of the present invention.

FIG. 7 is a flow chart 700 depicting operation of the radio communication system in accordance with the preferred embodiment of the present invention. After power up 702, the processing system 226 of the controller 112 accesses the partitioner 220 to assign 704 the cells 302 associated with each virtual channel on each radio frequency used by the radio communication system. Preferably, the cell assignments have been pre-programmed into the partitioner 220 and are based upon a predetermined radio propagation model using techniques well known in the art.

Next, in step 706 the processing system 226 defines the traffic load for each of the virtual channels. Preferably, the processing system 226 is programmed to define the traffic load for each virtual channel to be equal to the traffic load handled by a busiest one of the plurality of the cells 302 which are assigned to the virtual channel. It will be appreciated that, alternatively, the processing system 226 can be programmed to define the traffic load in some other manner. For example, the processing system 226 can be programmed to define the traffic load for each virtual channel to be equal to the average traffic load handled by the plurality of the cells 302 which are assigned to the virtual channel.

Next, the processing system 226 estimates 708 the traffic load that will be presented to each of the virtual channels during a next subsequent "stage". A stage is defined to be a predetermined time period during which the activation frequencies of the virtual channels remain constant, and preferably comprises one or more of the frame cycles 500. During each stage, the processing system 226 measures the actual traffic load presented to each of the virtual channels and stores the results in the RAM 210 using techniques well known in the art. After the system has operated long enough for the processing system 226 to have measured and stored the results for a predetermined positive integer number (K) of stages, the processing system 226 estimates the traffic load that will be presented to each of the virtual channels during the next subsequent stage by computing weighted average traffic loads for each of the virtual channels from the traffic loads measured and stored during the K stages prior to the next stage.

In more detail, let N be the total number of time slots in a stage, and let nA, nB, . . . be the number of time slots assigned to each virtual channel. Then the following is true:

$$nA+nB+ \ldots =N.$$

To optimize the time sharing for each radio channel at stage S+1: For each radio channel n, let na, nb, . . . be its virtual channels.

Let the cells assigned to na be $Ca_1, Ca_2, \ldots Ca_j$,
Let the cells assigned to nb be $Cb_1, Cb_2, \ldots Cb_j$,
and so on.

Let La(S) be a traffic load based on the traffic for $Ca_1 \ldots Ca_j$ at stage S. For example, let La(S) be the maximum traffic load experienced on any of the cells $Ca_1 \ldots Ca_j$ during stage S.

Let $\overline{La(S)}$ be the weighted average of La(S−K+1), La(S−K+2), . . . La(S);
that is:

$\overline{La(S)} = W_K La(S-K+1) + \ldots + W_1 La(S) + Ca$,
$\overline{Lb(S)} = W_K Lb(S-K+1) + \ldots + W_1 Lb(S) + Cb$, and so on, where $W_K, \ldots W_1$ are weights, and Ca, Cb, . . . are biases that can be used for additional adjustment of the weighted averages. The weighted averages preferably are time-weighted averages, giving more weight, for example, to traffic loads from the most recent stages. The weighted averages represent an estimate of the traffic loads for the virtual channels during the next subsequent stage (S+1).

To optimize the virtual channels, the processing system 226 computes the number of time slots during which the virtual channels will be activated at the next stage, as follows:

$$\frac{N \times \overline{La(S)}}{\overline{La(S)} + \overline{Lb(S)} + \ldots} \text{ time slots for } na,$$

$$\frac{N \times \overline{Lb(S)}}{\overline{La(S)} + \overline{Lb(S)} + \ldots} \text{ time slots for } nb,$$

and so on. Thus, the number of time slots activated for each virtual channel at the next stage is substantially proportional to the weighted average traffic load computed for the virtual channel, i.e., substantially proportional to the estimated traffic load for the virtual channel at the next stage.

It will be appreciated that the computed numbers of time slots must be rounded up or down to the nearest integer number of time slots, as appropriate. Also, after rounding, one or more of the computed numbers of time slots may have to be adjusted slightly to ensure that the total number of time slots is exactly equal to N. It will be further appreciated that immediately after a power up there is generally an insufficient traffic load history upon which to base the preceding calculations. In that case, the processing system 226 preferably will use, for example, a pre-programmed set of time sharing parameters for performing the time sharing of the radio channels until sufficient traffic data can be measured and stored in the RAM 210. Alternatively, the processing system 226 can estimate the next traffic load for each virtual channel to be proportional to an estimated average population served by all (or a busiest one) of the plurality of the cells 302 that are assigned to the virtual channel. The estimated population can be determined, for example, from census bureau databases and database query programs.

Continuing with the flow chart 700, after the processing system 226 has determined the number of time slots to be used for each of the virtual channels during the next stage, when the time for the next stage arrives the processing system 226 activates each of the virtual channels with a frequency of activation substantially proportional to the estimated traffic load of each virtual channel. Here the word "substantially" is used because of the error introduced by rounding the computed numbers of time slots for each virtual channel and by making any further adjustments required to bring the total number of time slots per stage to N.

After the next stage is in progress, for the purposes of the flow chart 700 the "next" stage has become 712 the "current" stage. Thus, during the current stage, the processing system 226 measures and stores 714 in the RAM 210 the actual traffic presented to each of the virtual channels. Then, the flow returns to step 708 to continue the process and to estimate the traffic load for the next subsequent stage.

It will be appreciated that, in a two-way communication system, the present invention can be applied to both the outbound channels and the inbound channels. When applying the time sharing techniques of the present invention to both communication directions, the controller 112 has to maintain separate records of outbound traffic load and inbound traffic load to separately optimize the time sharing of the outbound and inbound virtual channels.

Thus it should be apparent by now that the present invention provides a method and apparatus for time sharing a radio communication channel. The time sharing technique provided is advantageously less complex than the fully dynamic time sharing technique and thus does not require an excessive amount of computing power. The technique does, however, provide automatic adaptation to changes in traffic load distribution over time, for consistently maintaining maximum throughput in the radio communication system under varying traffic load conditions.

What is claimed is:

1. A method in a radio communication system for providing time sharing of a radio communication channel among a plurality of interfering cells, the radio communication channel utilized by the radio communication system for transmitting information in a plurality of time slots, the method comprising the steps of:

partitioning the radio communication channel into a plurality of virtual channels, a virtual channel able to be activated for the duration of one or more of the plurality of time slots, and utilized by a fixed portion of the radio communication system for communicating simultaneously with portable subscriber units in corresponding ones of the plurality of interfering cells which are assigned to the virtual channel;

operating no more than one of the plurality of virtual channels during any one of the plurality of time slots; and optimizing the time sharing of the radio communication channel by activating selected ones of the plurality of virtual channels during the one or more of the plurality of time slots, based upon a traffic load defined for each virtual channel to be equal to the traffic load handled by a busiest one of the plurality of interfering cells assigned to the virtual channel.

2. The method of claim 1, wherein the partitioning step comprises the step of assigning the ones of the plurality of interfering cells to the virtual channel based upon a predetermined radio propagation model.

3. The method of claim 1, wherein a traffic load history maintained for each virtual channel is insufficient to estimate a next traffic load, and wherein the optimizing step comprises the step of estimating the next traffic load for each virtual channel to be proportional to an estimated population served by a busiest one of the plurality of interfering cells that are assigned to the virtual channel.

4. The method of claim 1, wherein a traffic load history maintained for each virtual channel is insufficient to estimate a next traffic load, and wherein the optimizing step comprises the step of estimating the next traffic load for each virtual channel to be proportional to an estimated average population served by the plurality of interfering cells that are assigned to the virtual channel.

5. The method of claim 1, wherein the time sharing of the radio communication channel is divided into a plurality of stages of predetermined duration, and wherein the optimizing step comprises the step of estimating the traffic load for a subsequent stage from the traffic load occurring during K stages prior to the subsequent stage, where K is a positive integer.

6. The method of claim 5, wherein the estimating step comprises the step of computing a plurality of weighted average traffic loads for ones of the plurality of virtual channels, the plurality of weighted average traffic loads computed for K stages prior to the subsequent stage, and wherein the optimizing step further comprises the step of activating the selected ones of the plurality of virtual channels with a frequency of activation that is substantially in proportion to corresponding ones of the plurality of weighted average traffic loads.

7. A communication system controller in a radio communication system for providing time sharing of a radio communication channel among a plurality of interfering cells, the radio communication channel utilized by the radio communication system for transmitting information in a plurality of time slots, the communication system controller comprising:

a network interface for accepting messages to be transmitted on the radio communication channel;

a transmitter interface coupled to the network interface for transmitting the messages;

a processing system coupled to the network interface and to the transmitter interface for directing operations of the communication system controller;

a partitioner coupled to the processing system for partitioning the radio communication channel into a plurality of virtual channels, a virtual channel able to be activated for the duration of one or more of the plurality of time slots, and utilized by a fixed portion of the radio communication system for communicating simultaneously with portable subscriber units in corresponding ones of the plurality of interfering cells which are assigned to the virtual channel; and a multiplexer coupled to the processing system for operating no more than one of the plurality of virtual channels during any one of the plurality of time slots, wherein the processing system is programmed to optimize the time sharing of the radio communication channel by activating selected ones of the plurality of virtual channels during the one or more of the plurality of time slots, based upon a traffic load defined for each virtual channel to be equal to the traffic load handled by a busiest one of the plurality of interfering cells assigned to the virtual channel.

8. The communication system controller of claim 7, wherein the partitioner is arranged to assign the ones of the plurality of interfering cells to the virtual channel based upon a predetermined radio propagation model.

9. The communication system controller of claim 7, wherein the processing system is programmed to divide the time sharing of the radio communication channel into a plurality of stages of predetermined duration, and to estimate the traffic load for a subsequent stage from the traffic load occurring during K stages prior to the subsequent stage, where K is a positive integer.

10. The communication system controller of claim 9, wherein the processing system is further programmed to compute a plurality of weighted average traffic loads for ones of the plurality of virtual channels, the plurality of weighted average traffic loads computed for K stages prior to the subsequent stage, and to activate the selected ones of the plurality of virtual channels with a frequency of activation that is substantially in proportion to corresponding ones of the plurality of weighted average traffic loads.

11. A method in a radio communication system for providing time sharing of a radio communication channel among a plurality of interfering cells, the radio communication channel utilized by the radio communication system for transmitting information in a plurality of time slots, the method comprising the steps of:

partitioning the radio communication channel into a plurality of virtual channels, a virtual channel able to be activated for the duration of one or more of the plurality of time slots, and utilized by a fixed portion of the radio communication system for communicating simultaneously with portable subscriber units in corresponding ones of the plurality of interfering cells which are assigned to the virtual channel;

operating no more than one of the plurality of virtual channels during any one of the plurality of time slots; and optimizing the time sharing of the radio communication channel by activating selected ones of the plurality of virtual channels during the one or more of the plurality of time slots, based upon a traffic load defined for each virtual channel to be equal to an average traffic load handled by the plurality of interfering cells which are assigned to the virtual channel.

12. The method of claim 11, wherein the partitioning step comprises the step of assigning the ones of the plurality of interfering cells to the virtual channel based upon a predetermined radio propagation model.

13. The method of claim 11,
wherein a traffic load history maintained for each virtual channel is insufficient to estimate a next traffic load, and
wherein the optimizing step comprises the step of estimating the next traffic load for each virtual channel to be proportional to an estimated population served by a busiest one of the plurality of interfering cells that are assigned to the virtual channel.

14. The method of claim 11,
wherein a traffic load history maintained for each virtual channel is insufficient to estimate a next traffic load, and
wherein the optimizing step comprises the step of estimating the next traffic load for each virtual channel to be proportional to an estimated average population served by the plurality of interfering cells that are assigned to the virtual channel.

15. The method of claim 11,
wherein the time sharing of the radio communication channel is divided into a plurality of stages of predetermined duration, and
wherein the optimizing step comprises the step of estimating the traffic load for a subsequent stage from the traffic load occurring during K stages prior to the subsequent stage, where K is a positive integer.

16. The method of claim 15,
wherein the estimating step comprises the step of computing a plurality of weighted average traffic loads for ones of the plurality of virtual channels, the plurality of weighted average traffic loads computed for K stages prior to the subsequent stage, and
wherein the optimizing step further comprises the step of activating the selected ones of the plurality of virtual channels with a frequency of activation that is substantially in proportion to corresponding ones of the plurality of weighted average traffic loads.

17. A communication system controller in a radio communication system for providing time sharing of a radio communication channel among a plurality of interfering cells, the radio communication channel utilized by the radio communication system for transmitting information in a plurality of time slots, the communication system controller comprising:

a network interface for accepting messages to be transmitted on the radio communication channel;

a transmitter interface coupled to the network interface for transmitting the messages;

a processing system coupled to the network interface and to the transmitter interface for directing operations of the communication system controller;

a partitioner coupled to the processing system for partitioning the radio communication channel into a plurality of virtual channels, a virtual channel able to be activated for the duration of one or more of the plurality of time slots, and utilized by a fixed portion of the radio communication system for communicating simultaneously with portable subscriber units in corresponding ones of the plurality of interfering cells which are assigned to the virtual channel; and a multiplexer coupled to the processing system for operating no more than one of the plurality of virtual channels during any one of the plurality of time slots, wherein the processing system is programmed to optimize the time sharing of the radio communication channel by activating selected ones of the plurality of virtual channels during the one or more of the plurality of time slots, based upon a traffic load defined for each virtual channel to be equal to an average traffic load handled by the plurality of interfering cells which are assigned to the virtual channel.

18. The communication system controller of claim 17, wherein the partitioner is arranged to assign the ones of the plurality of interfering cells to the virtual channel based upon a predetermined radio propagation model.

19. The communication system controller of claim 17,
wherein the processing system is programmed to divide the time sharing of the radio communication channel into a plurality of stages of predetermined duration, and to estimate the traffic load for a subsequent stage from the traffic load occurring during K stages prior to the subsequent stage, where K is a positive integer.

20. The communication system controller of claim 19,
wherein the processing system is further programmed to compute a plurality of weighted average traffic loads for ones of the plurality of virtual channels, the plurality of weighted average traffic loads computed for K stages prior to the subsequent stage, and to activate the selected ones of the plurality of virtual channels with a frequency of activation that is substantially in proportion to corresponding ones of the plurality of weighted average traffic loads.

* * * * *